United States Patent
Hughes et al.

[15] 3,663,945
[45] May 16, 1972

[54] APPARATUS FOR PROVIDING AC ELECTRICAL ENERGY AT A PRESELECTED FREQUENCY

[72] Inventors: William L. Hughes; Hansel J. Allison; Ramachandra G. Ramakumar, all of Stillwater, Okla.

[73] Assignee: Oklahoma State University, Stillwater, Okla.

[22] Filed: Sept. 4, 1970

[21] Appl. No.: 69,675

[52] U.S. Cl. ................................................321/61, 322/87
[51] Int. Cl. .............................................................H02m 5/00
[58] Field of Search ............................................321/60–62, 69; 322/29, 61, 87; 310/169, 170

[56] References Cited

UNITED STATES PATENTS

| | | |
|---|---|---|
| 3,001,124 | 9/1961 | Johnson...................................322/61 |
| 3,152,297 | 10/1964 | Peaslee....................................321/61 |
| 3,178,630 | 4/1965 | Jessee...................................321/61 X |
| 3,256,244 | 6/1966 | Byloff et al. ............................321/61 |
| 3,419,785 | 12/1968 | Lafuze..................................321/61 X |
| 3,419,783 | 12/1968 | Bingley................................321/61 X |
| 3,454,864 | 7/1969 | Roesel, Jr. ...........................322/61 X |

Primary Examiner—William M. Shoop, Jr.
Attorney—Head & Johnson

[57] ABSTRACT

A method and apparatus for providing AC electrical energy at a preselected frequency including a driven AC generator having an externally excitable field, means connected to the generator field for exciting the field at the preselected frequency whereby the generated AC output is modulated at the preselected frequency, and rectifier means connected to the generator output by which the modulated generator output is rectified to obtain AC output at the preselected frequency, the frequency of the AC output being independent of the speed of rotation of the AC generator.

13 Claims, 20 Drawing Figures

INVENTORS
WILLIAM L. HUGHES
HANSEL J. ALLISON
RAMACHANDRA G. RAMAKUMAR
BY Head & Johnson
ATTORNEYS Patented May 16, 1972
3,663,945
6 Sheets-Sheet 3
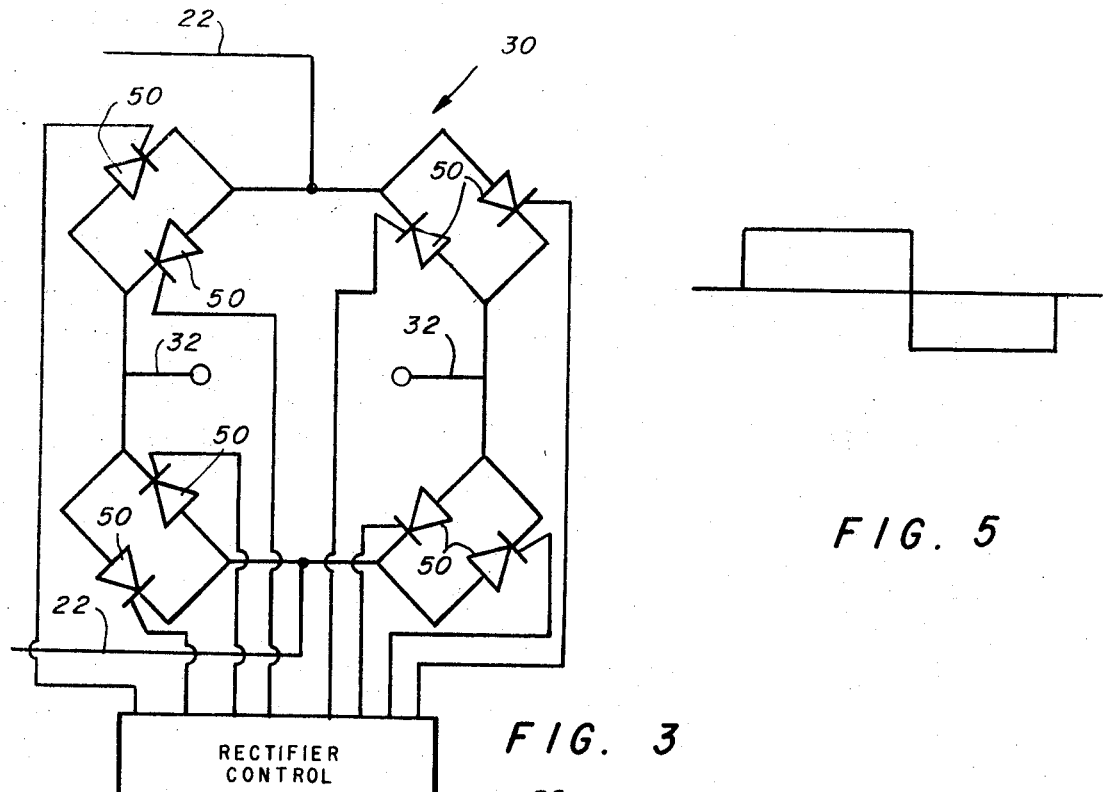
FIG. 3
FIG. 5
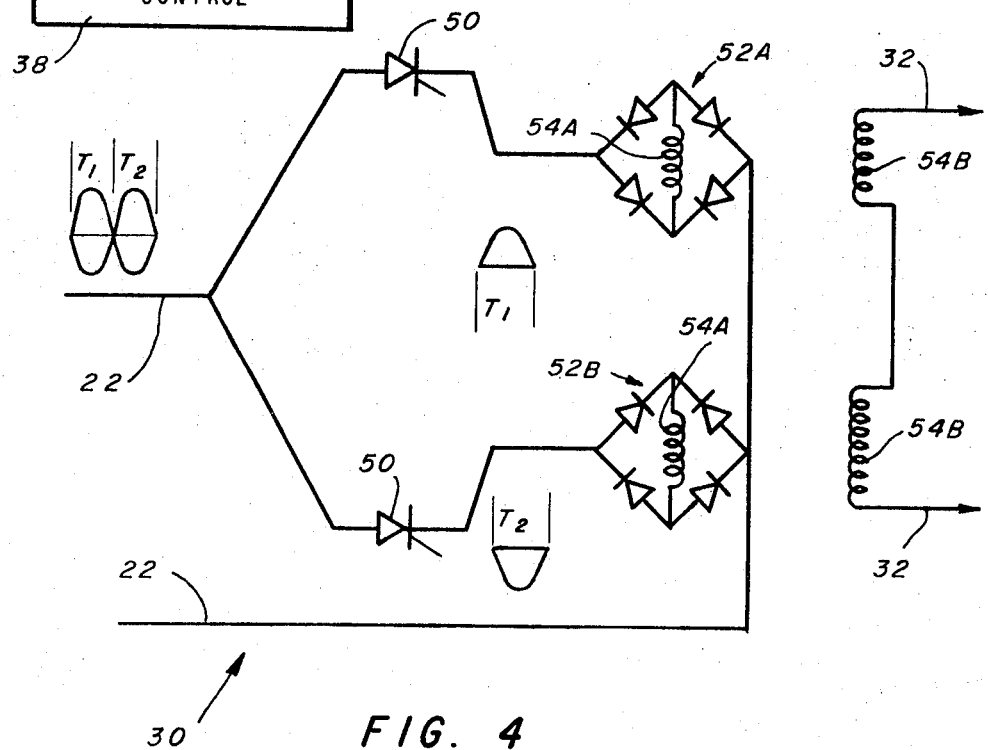
FIG. 4
INVENTORS,
WILLIAM L. HUGHES
HANSEL J. ALLISON
RAMACHANDRA G. RAMAKUMAR
BY
*Head & Johnson*
ATTORNEYS INVENTORS.
WILLIAM L. HUGHES
HANSEL J. ALLISON
RAMACHANDRA G. RAMAKUMAR
BY *Head & Johnson*
ATTORNEYS

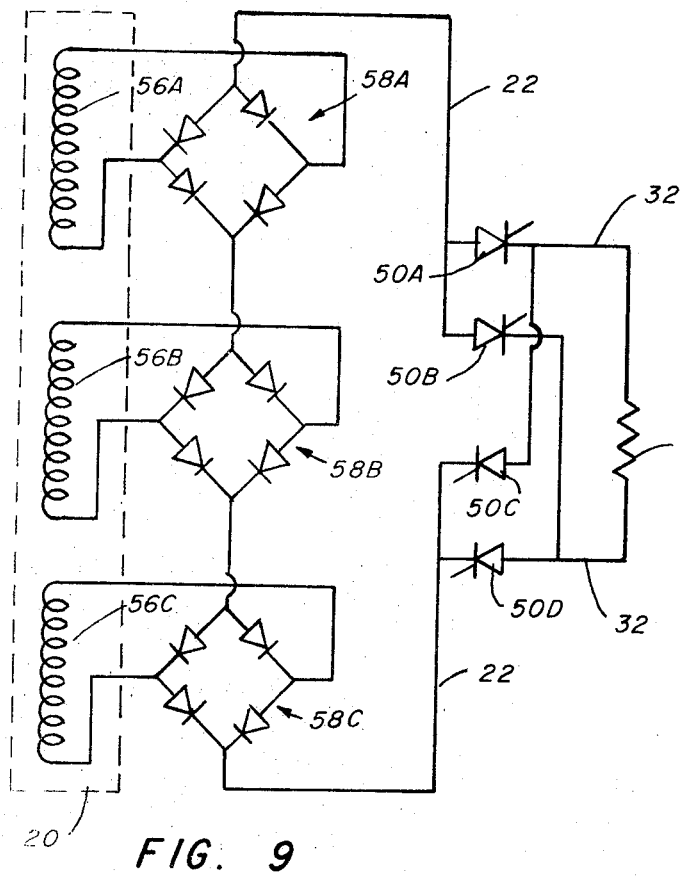
FIG. 9
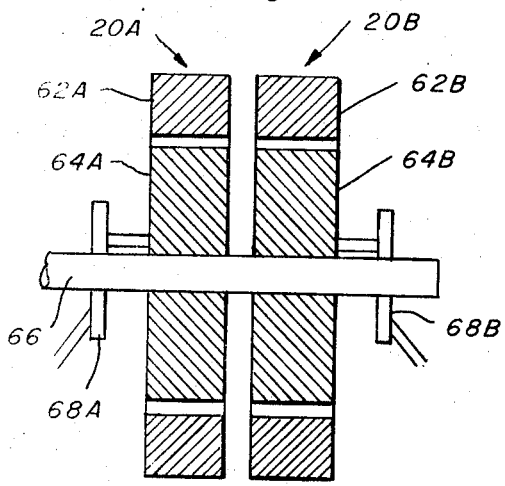
FIG. 11
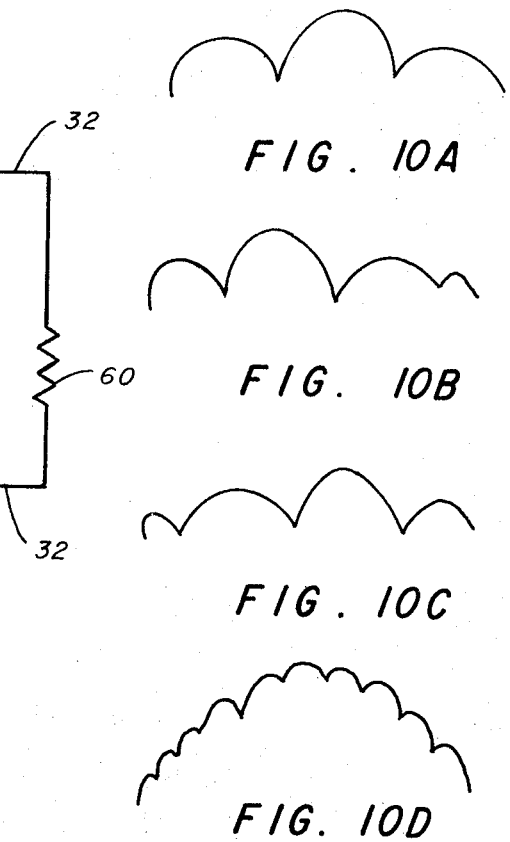
FIG. 10A
FIG. 10B
FIG. 10C
FIG. 10D
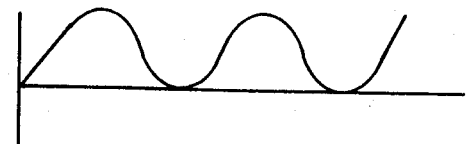
FIG. 12A
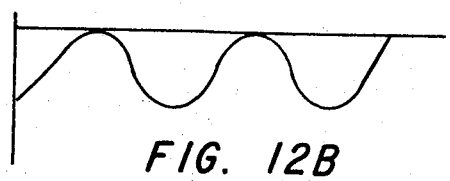
FIG. 12B
INVENTORS.
WILLIAM L. HUGHES
HANSEL J. ALLISON
RAMACHANDRA G. RAMAKUMAR
BY
*Head & Johnson*
ATTORNEYS INVENTORS.
WILLIAM L. HUGHES
HANSEL J. ALLISON
RAMACHANDRA G. RAMAKUMAR
BY
*Head & Johnson*
ATTORNEYS 3,663,945

APPARATUS FOR PROVIDING AC ELECTRICAL ENERGY AT A PRESELECTED FREQUENCY

BACKGROUND, SUMMARY AND OBJECTS OF THE INVENTION

The most common means of generating AC energy is by means of a generator driven by a prime mover. In the United States, and in many other countries of the world, the standard AC frequency is 60 cycles per second and the electric power and transmitting industry is equipped to transmit AC energy throughout the nation, and other parts of the world, only at this relatively low frequency. It has long been known that the size, and therefore the expense of building a generator to produce a preselected power output increases as the frequency decreases. That is, a generator to produce a given kilowatt out can be built more economically if it is constructed to operate at a higher frequency compared to 60 cycles per second. Since the standard in the industry, however, has become 60 cycles per second, and since the electric utility companies are geared to produce and distribute energy at 60 cycles only, the use of high frequency generators is not practical.

This invention provides a means of utilizing a high frequency generator to produce a low frequency output. This is one example of the application of the invention. In its broader concept the invention relates to a means of utilizing an AC generator designed for a high frequency output to be adapted to provide AC energy output at any selected lower frequency.

When two AC generators are operated in parallel the speed of rotation of the generators must be synchronized so that the generator outputs are in phase with each other. This becomes a problem in the utility industry in which the paralleled generating facilities may be physically spread from each other, sometimes by many miles. This invention provides a means of generating electrical energy by means of paralleled rotating AC generators wherein the speed of rotation of the generators does not have to be synchronized.

It is an object of this invention to provide a method and apparatus for operating an AC generator driven by a prime mover such that the frequency output of the generator is variable and independent of the speed of generator rotation.

Another object of a method and apparatus of this invention is to provide a method and apparatus of combining field excitation modulation of an AC generator with rectifier means such that the primary generator output frequency is essentially independent of prime mover speed.

These general objects, as well as more specific objects of the invention, will be fulfilled by the method and apparatus to be described in the following specifications and claims, taken in conjunction with the attached drawings.

DESCRIPTION OF VIEWS

FIG. 3 is a schematic of one example of a switched rectifier system which is used as a portion of the method and apparatus of producing a lower output frequency from a high frequency AC generator.

FIG. 4 is a schematic of an alternate embodiment of a switched rectifier system.

FIG. 5 is a diagram of a control voltage which may be utilized to control the switched rectifier system of FIG. 3.

FIG. 9 is a schematic diagram showing an embodiment of a three phase generator with the switched rectifier system.

FIGS. 10A, 10B and 10C are voltage diagrams of the individual phase outputs of the circuit arrangement of FIG. 9.

FIG. 10D is a voltage diagram of the output of the switched rectifier system, constituting a summation of the voltages as reflected in FIGS. 10A, 10B and 10C.

FIG. 11 is a cross-sectional view of two AC generators, the rotors of which are secured to the same shaft, the rotating fields being connected to separate slip rings so that the fields may be independently excited as a means of practicing an alternate embodiment of the invention.

FIG. 12A is a voltage diagram of the excitation voltage fed to the field of one of the generators of FIG. 11 and FIG. 12B is a voltage diagram of the excitation voltage fed to the field of the other generator.

DETAILED DESCRIPTION

Figure 1:
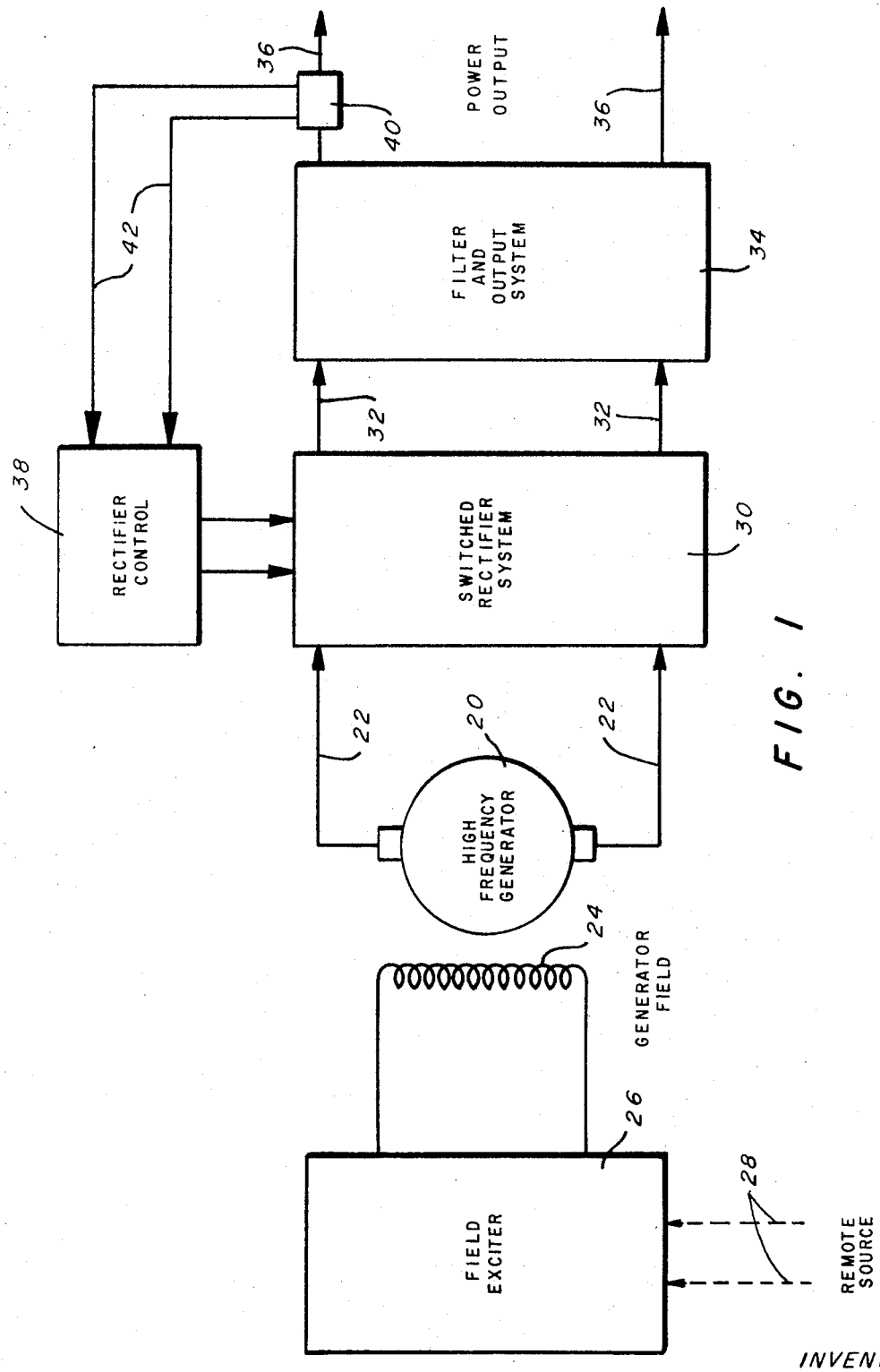
FIG. 1 is a block diagram of the basic components used to practice the method of this invention wherein a generator is operated to provide a power output at a preselected frequency independent of the speed of generator rotation.

Turning now to the drawings, first to FIG. 1, a basic system by which the invention may be practiced is illustrated in block diagram. Electrical energy is provided by a high frequency generator 20 driven by a prime mover (the prime mover not being shown). Assuming it is desired to provide 60 cycle AC energy output, the generator 20, according to this invention, may produce AC energy out at conductors 22 at any frequency higher than 60 cycles per second. From a practical standpoint, the frequency of generator 20 should be several multiples of the desired output such as, when the desired output is 60 cycles per second, generator 20 should preferably produce AC energy output at conductors 22 at a frequency in excess of 180 cycles per second to simplify subsequent filter requirements. Since, as previously mentioned, the size of an AC generator necessary to produce a preselected energy level output decreases as the frequency increases, it is desirable that the frequency of generator 20 be several hundred or several thousand cycles per second.

Numeral 24 indicates the field of generator 20. AC generators are of two basic types; one being the revolving armature stationary field type, and the other being the revolving field stationary armature type. The revolving armature AC generator is seldom used since power output must be transmitted through slip rings. This invention will function in the same manner regardless of the type of AC generator to which it is applied, but will be described as it relates to a revolving field AC generator. In normal operation, typical of AC generator-application at the present time, field 24 of generator 20 is connected to a DC voltage source to cause a steady state magnetic field which is rotated by the rotor to produce AC energy in the stationary armature windings, AC energy appearing in conductors 22. By this invention, instead of the application of a DC voltage to field 24, an AC voltage is applied at the frequency of the ultimately desired AC energy output. A field exciter apparatus 26 provides the AC voltage to generator field 24. Field exciter 26 may be the form such as an AC generator, a crystal controlled frequency source, or any other AC voltage source. As indicated by the dotted lines 28, the field exciter 26 may be remotely controlled to provide synchronization of the generator output with paralleled generating facilities.

Figure 8A:
FIG. 8A is a diagram of the voltage output from a generator having the field modulated at the alternately desired AC output frequency.

The AC energy output from generator 20 appearing at conductors 22 is a modulated AC voltage as shown in FIG. 8A, the fundamental frequency being that of the generator output 20 which is determined by the number of poles and the speed of rotation of the generator with the modulation frequency being controlled by field exciter 26.

The voltage shown in FIG. 8A is fed to a switched rectifier system 30. Within the switched rectifier system 30 the signal output from generator 20 is rectified to provide output at conductors 32 of the signal such as appears in FIG. 8B. The rectified, modulated high frequency AC energy at conductors 32 is applied to filter and output system 34 wherein the high frequency AC components are filtered out and the desired AC output voltage is provided at power output conductors 36.

It can be seen that the AC energy output appearing at conductors 36 is independent of the fundamental frequency output at conductors 22 from generator 20 but instead the frequency of the AC energy at conductors 36 is determined by the field exciter 26.

In order to properly control the switching in the switched rectifier system 30 a rectifier control 38 is provided. It is obviously highly desirable that switching of the rectifier system take place at instance of zero current flow. If the load applied to power output conductors 36 has a unity power factor the control of the switched rectifier system 30 may be simultaneous with the modulation of generator field 24 and thus a signal from field exciter 26 may be used to govern the rectifier control 38. However, unit power factor load is seldom encountered and therefore the current may lead or lag the voltage in the output conductors 36. If such occurs and if switching takes place at a point other than at zero current, then the switching devices used in switched rectifier system 30 would need to be of a size and capacity to handle such current flows. To eliminate this requirement rectifier control 30 is preferably actuated to induce switching in the switched rectifier system 30 at times of minimum current flow. To accomplish this, a current transformer 40 connected to output conductor 36 may be utilized to sense the point of zero current flow. Current transformer is connected to the rectifier control 38 by conductor 42 to cause switching to take place at zero current thereby making possible the use of rectifier control devices having minimum current interrupting capacities.

Figure 2:
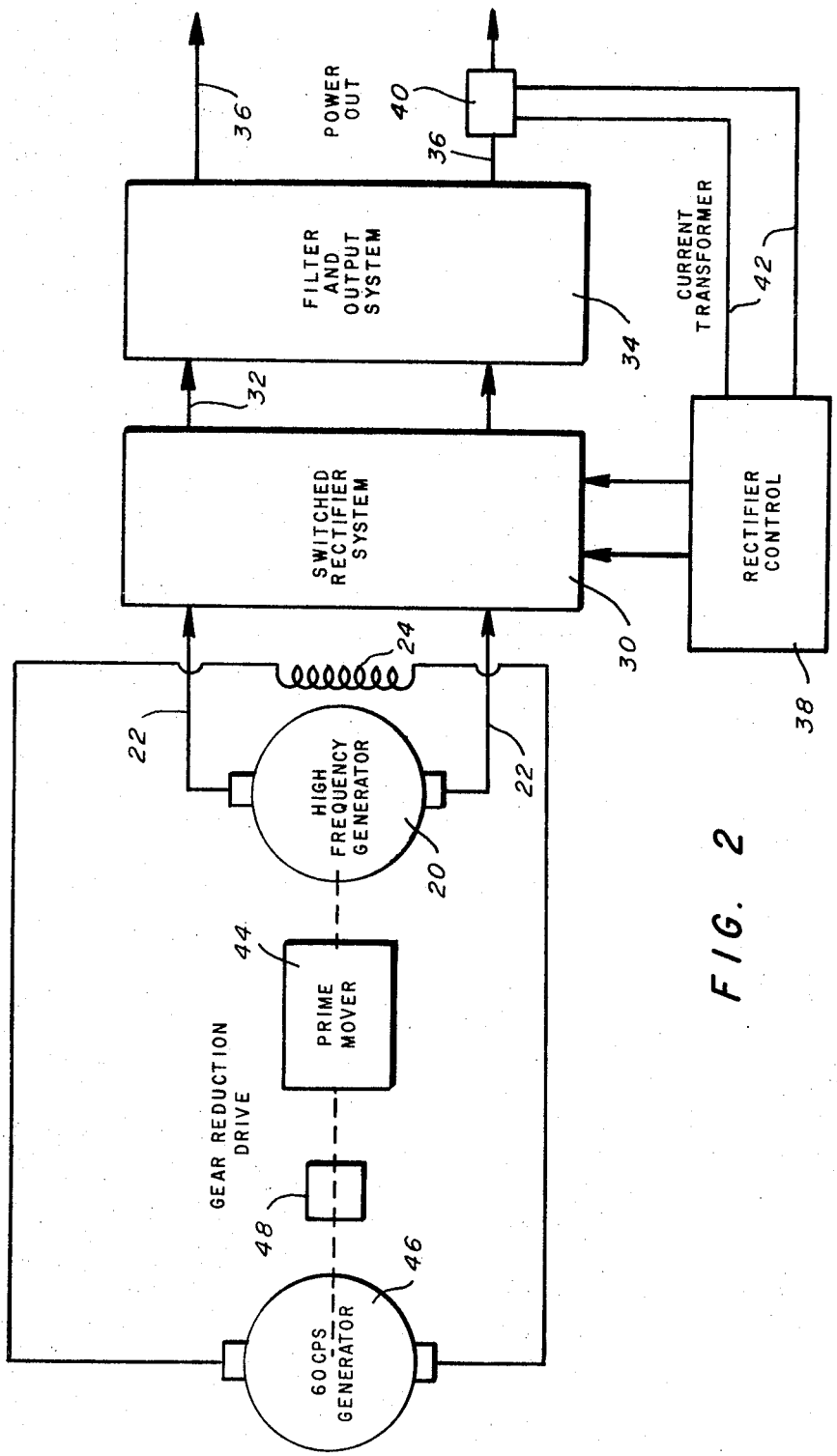
FIG. 2 is a block diagram of an alternate embodiment of the invention for the production of low frequency energy output by utilization of a higher frequency generator.

FIG. 2 shows a slightly altered arrangement of the basic concept of the invention. In FIG. 2, generator 20 is driven by a prime mover 44. To provide means for modulation of the high frequency generator 20, voltage applied to field 24 is supplied by a 60 cycle generator 46. Prime mover 44 is coupled to the generator 46 by means of a gear reducer 48. The balance of the arrangement of FIG. 2 functions are described with reference to FIG. 1. In the arrangement of FIG. 2, the modulated field excitation is simply supplied by lower frequency (60 Hz) generator 46 driven by the same prime mover, however this arrangement has the disadvantage that the power output at conductors 36 has a frequency dependent upon the rate of rotation of the prime mover 44 and therefore does not have some of the advantages which accrue to other means for exciting the field of generator 20. In addition, the arrangement of FIG. 2 does not easily lend itself to remote control of the frequency of the power out at conductors 36, such as for purposes of synchronizing with other paralleled energy producing systems.

Figure 8B:
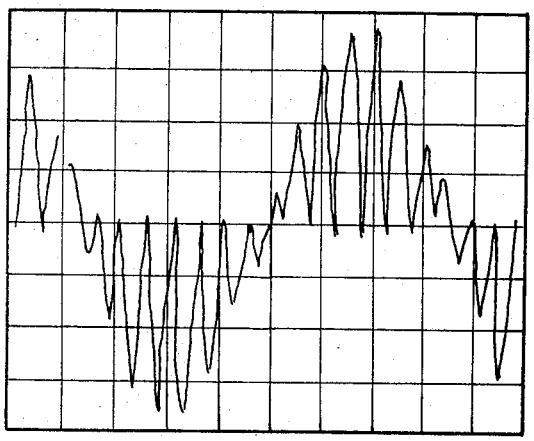
FIG. 8B is a diagram of the voltage output of a generator having the field modulated at the desired output frequency and after the output has passed through the switched rectifier system.

FIG. 3 shows one arrangement of a switched rectifier system which may be utilized in the invention. Modulated high frequency energy having a wave form of FIG. 8 is supplied from the generator output conductors 22. By means of a bridge circuit of paralleled switchable rectifiers 50, the output of the generator is converted to a rectified voltage as shown in FIG. 8B. This wave form appears at conductors 32. While controlled rectifiers 50 are illustrated as a means of obtaining the switched rectifier system 30, other types of controllable rectifiers, such as thyratrons, will function equally as well.

Each switchable rectifier 50 is controlled by a suitable trigger signal, such as a square wave signal as illustrated in FIG. 5, supplied by rectifier control 38, the signal being applied to the rectifier trigger element.

FIG. 4 shows an alternate arrangement for a switched rectifier system 30. The voltage output from the high frequency generator appearing at conductor 22 is supplied to controlled rectifiers 50 and from thence to rectifier bridge circuits 52A and 52B. Across each bridge circuit is a primary of a transformer 54A. The secondaries of the transformers 54B provide the output of the switched rectifier system, appearing at conductors 32. The signal appearing at conductor 32 is illustrated by the voltage wave form showing one complete cycle. The voltage appearing across the transformer primaries 54A and 54B is also illustrated. By this arrangement during the period $T_1$ the upper rectifier 50 is turned on and the lower rectifier 50 is turned off. During the period $T_2$, the upper rectifier 50 is turned off and the lower rectifier 50 is turned on.

Figure 6:
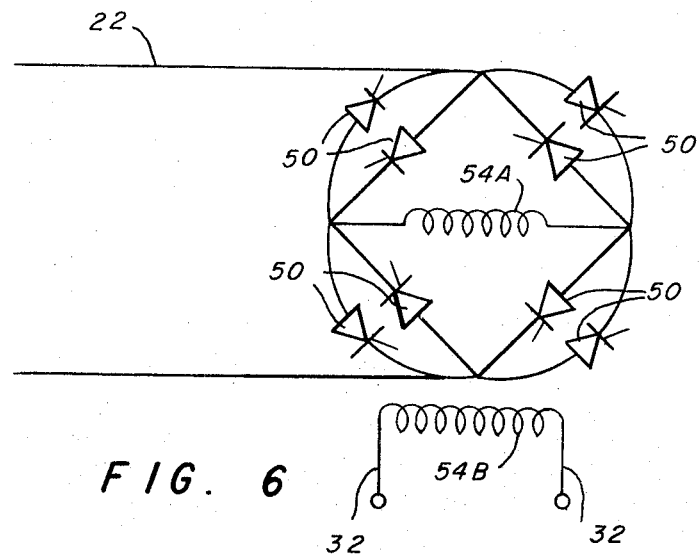
FIG. 6 is a schematic showing the switched rectifier system of FIG. 3 connected to an output transformer.
Figure 7:
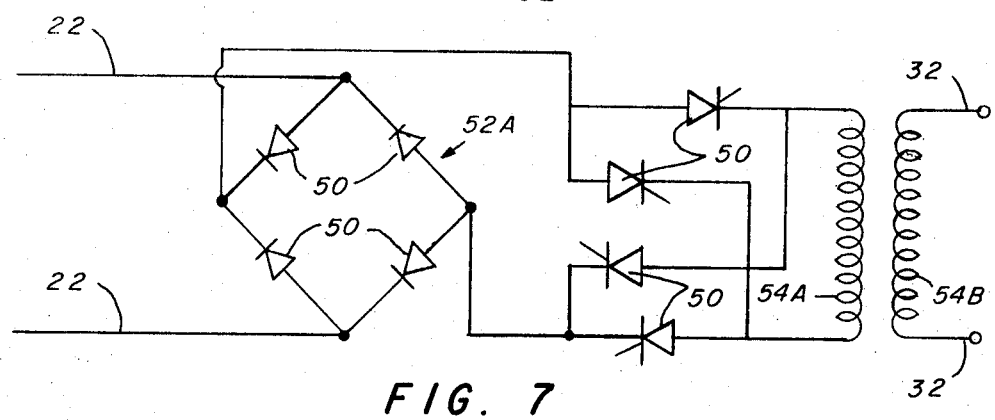
FIG. 7 is an additional alternate arrangement of a switched rectifier system.

FIGS. 6 and 7 show still other arrangements for providing the switched rectifier system of the invention, as an illustration that the specific embodiment of such portion of the invention may take many forms.

Figure 13A:
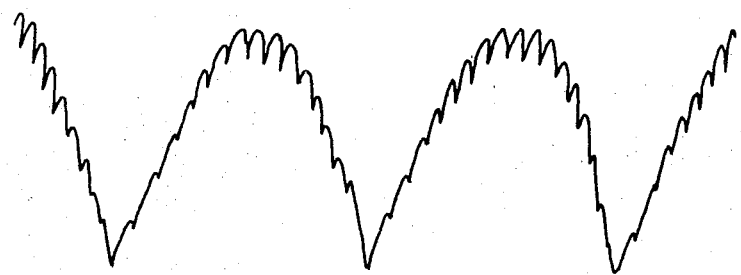
FIG. 13A is a voltage diagram of the output of the mechanism of the embodiment of FIG. 11.

This invention as described to this point has been to the simple form of the single phase application. FIG. 9 is a schematic arrangement of a three phase generator arrangement. Generator 20 has three armature windings 56A, 56B and 56C. The output of each of the armature windings is fed to bridge rectifiers 58A, 58B and 58C. With the field winding (not shown in FIG. 9) modulated at the ultimately desired output frequency, the voltage out of bridge circuit 58A will appear as illustrated in FIG. 10A, the output of bridge circuit 58B as illustrated in FIG. 10B, and the output of bridge circuit 58C as illustrated in FIG. 10C. The output of the bridges 58A, 58B and 58C in connected series is illustrated so that the voltages are summed, and appearing at conductors 22 in form as shown in FIG. 10B. FIG. 13A shows an enlarged view of the wave form 10D which appears as conductors 22. This voltage is applied to switched rectifier system 30 consisting of the four illustrated switched rectifiers 50A, 50B, 50C and 50D. Rectifiers 50A and 50B are triggered together and rectifiers 50C and 50D are triggered together by a rectifier control (not shown in FIG. 3) to provide AC energy output at conductors 32 having the wave form shown in FIG. 13B. This wave form has the frequency of the modulation of the field of generator 20 with the switchable rectifier system 30 switched in synchronization to provide a single phase AC voltage applied to load 60. To eliminate the high frequency AC components remaining in the voltage at conductors 32, as shown in FIG. 13B, filtering arrangements of known practice may be utilized.

Another means of utilizing a three phase generator in the practice of this invention includes the reversal of armature windings 56B, 56C in series with winding 56A (FIG. 9) with the series output fed directly to a single bridge rectifier and from the bridge rectifier to a switched rectifier system 30. This arrangement results in single phase AC voltage at twice the value of the voltage appearing at any one of the armature windings.

FIG. 11 shows an additional alternate embodiment of the invention wherein the generator is split into two portions, 20A and 20B. Generator 20A includes a stator-armature portion 62A and a rotor-field 64A. In like manner generator 20B includes a stator-armature 62B and a rotor-field 64B. Both the rotor-fields are secured to the same shaft 66. Also affixed to shaft 66 is a first slip ring 68A providing electrical connection to rotor-field 64A and a second slip ring 68B providing electrical connection to rotor-field 64B. Each of the generators 20A and 20B may be connected as shown in FIG. 9 to provide, after the bridges 58A, 58B and 58C voltage outputs as shown in FIGS. 12A and 12B. That is, generator 20A may have an output as shown in FIG. 12A and generator 20B an output as shown in FIG. 12B. This is arranged by having the field excitation such that the field of generator 20A is excited by a wave form having the mathematical relationship $A + B \sin \omega t$ and the wave form exciting the field of generator 20B having the relationship $-A + B \sin \omega t$, wherein "A" represents the DC component and "B sin wt" the AC component. The outputs from the two generators 20A and 20B after passing the bridge circuits may then be directly combined to provide a voltage having the wave form of FIG. 13B without the necessity of utilizing a switched electrifier system. Such arrangement also eliminates the power factor problem encountered in switching rectifiers as previously discussed. In addition, if the fields of generators 20A and 20B are excited in such a way as to resonate, the generator output builds up appropriately by itself.

Figure 13B:
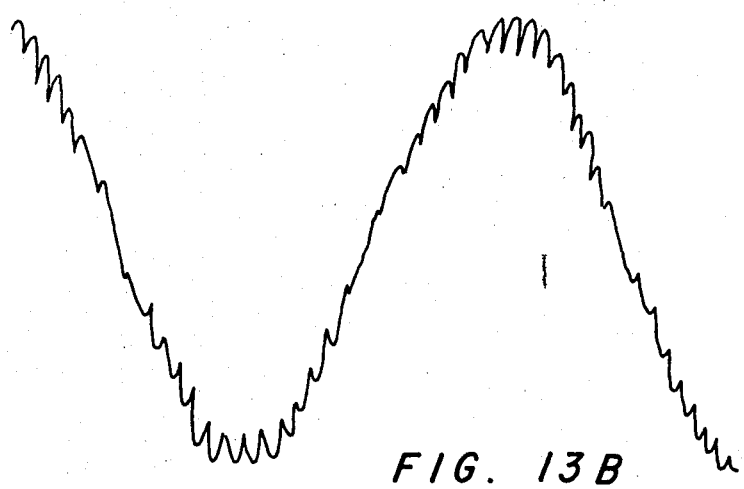
FIG. 13B is a voltage diagram of the output of the mechanism of the embodiment of FIG. 11 after passing through a switched rectifier circuit.

The embodiment of FIG. 11 may be practiced by making generator 20B a DC generator supplying a −A DC component which when added to the rectified output of generator 20A, cancels the DC component of generator 20A to provide the wave form of FIG. 13B without the use of switching rectifiers.

Figure 14:
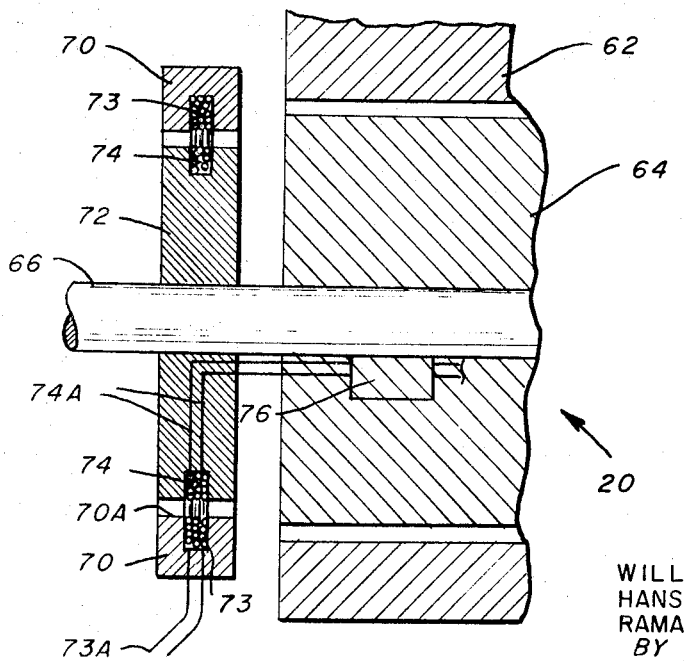
FIG. 14 is a cross-sectional view of a portion of a rotating field generator in which field excitation is supplied by a transformer having a rotating secondary, thereby eliminating the need for slip rings.

The advantages of this invention are enhanced by utilizing generators designed to utilize high frequency generators which means the fields must be rapidly rotated. The voltage necessary to modulate the field must be passed to the rapidly rotating fields. While slip rings work satisfactorily at low speeds, problems are encountered at exceedingly high rotation rates. FIG. 14 shows an arrangement for solving this problem.

Generator 20 has a stator-armature 62, and a rotor-field 64 rotated by shaft 66. Normally a slip ring is affixed to shaft 66 as means of providing electrical energy to the rotating field 64. In place of such slip rings a transformer arrangement is provided by means of which voltage is induced to drive field 64. A transformer stationary element 70 has an internal circumferential groove receiving a stationary coil 73 with conductor 73A extending from the coil. The AC voltage is applied by conductor 73A to the stationary coil 73. Affixed to shaft 66 is a transformer rotating element 72 having an external circumferential groove on which is wound a transformer secondary coil 74. The rotating element 72 rotates within the circular opening 70A in the stationary element but does not touch the stationary element. Conductors 74A extend from coil 74 to the generator rotating field 64. With AC voltage applied to conductors 73A voltage is induced from the primary 73 to the secondary 74 and transmitted by conductor 74A to the rotating field 64. Induction between primary 73 and secondary 74 takes place regardless of speed of rotation of the shaft 66. If DC voltage is required for excitation of field 64 it may be supplied by means of a rectifier system 76 carried on shaft 66, which may be, as illustrated, within the rotor 64. Rectifier 76 may be arranged such as to produce a voltage excitation of the field consisting of a DC voltage with AC component superimposed thereon such as utilized with reference to the embodiment of FIG. 11 previously described.

It can be seen that the frequency of field modulation may be time varied. Thus the expression "preselected frequency" means the desired output frequency of any instant of time, which frequency may be varied as desired.

While the invention has been described with a certain degree of particularity it is manifest that many changes may be made in the details of construction and the arrangement of components without departing from the spirit and scope of this disclosure. For instance, various generator outputs are obtainable by varying: (a) the number of magnetic circuits; (b) the field excitation waveform, including harmonic content; (c) the amount of DC versus AC in the field excitation; (d) the degree of field core saturation; and (3) the number of phases of the generator. The invention is not limited to the method and apparatus set forth herein for purposes of exemplifying the invention, but the invention is to be limited only by the scope of the attached claim or claims, including the full range of equivalency to which each element or step thereof is entitled.

What is claimed:

1. A generator, comprising:
   a stator having armature windings;
   a rotor rotatably supported relative to said stator, said rotor having field windings;
   a transformer secondary rotated with said rotor and having electrical connection to said generator field windings; and
   a transformer primary stationarily supported adjacent said stator, said transformer when energized by AC voltage providing generator field excitation.

2. A generator according to claim 1 including rectifier means affixed to said rotor having electrical connection to said transformer secondary and to said field windings.

3. A generator according to claim 1 including:
   means of exciting said transformer primary and thereby said generator field at a preselected frequency whereby said stator windings provide AC energy modulated at the preselected frequency; and
   rectifier means having a power input, and a power output, the power input being connected to said generator, the modulated output of said generator being rectified to provide AC energy at the preselected frequency.

4. Apparatus for providing AC electrical energy at a preselected frequency according to claim 3 in which said rectifier means is controlled in synchronization with the preselected frequency.

5. Apparatus for providing AC electrical energy at a preselected frequency according to claim 3 in which said rectifier means is controlled in response to the current flow at the rectifier means output.

6. Apparatus for providing AC electrical energy at a preselected frequency according to claim 5 including a current transformer means in series with said rectifier means power output, and means controlling said rectifier means in response to detected current flow in said current transformer to switch said rectifier means when the detected current flow is minimum.

7. Apparatus for providing AC electrical energy at a preselected frequency according to claim 3 in which said AC generator is a three phase generator having three power output circuits each providing AC energy at a frequency higher than the preselected frequency and in equally spaced phased relationship and including:
   a full wave rectifier means connected to each of said three power output, said full wave power outputs being connected in series with said controlled rectifier means power input.

8. Apparatus for providing AC electrical energy at a preselected frequency according to claim 3 in which said AC generator is a three phase generator having three power output circuits each providing AC energy at a frequency higher than the preselected frequency and in equally spaced phased relationship, and in which the three power output circuits are connected in series with two of the power output circuits reversed, the seriesed connection providing said generator AC energy connected to said controlled rectifier means power input.

9. Apparatus for providing AC electrical energy at a preselected frequency according to claim 3 in which said rectifier means is a controlled rectifier means.

10. Apparatus for providing AC electrical energy according to claim 3 in which said generator includes two electrically and magnetically separated stator-armature portions and two electrically and magnetically separated rotor-fields rotated by the same shaft, and wherein a separate rectifier means is connected to each said stator-armature, the outputs of the rectifier means being combined to provide electrical energy output at the preselected frequency.

11. Apparatus for providing AC electrical energy according to claim 10 in which one of said generator fields is modulated by a voltage signal defined by the relationship A + B sin wt and the other of said generator fields is modulated by a voltage signal defined by the relationship − A + B sin wt, wherein "A" is a DC voltage component and "B sin wt" is an AC voltage component.

12. A generator for providing AC electrical energy at a preselected frequency, comprising:
   a rotated shaft;

first and second electrically and magnetically separated rotor fields rotated by said shaft;

first and second electrically and magnetically separated stator-armatures positioned adjacent said first and second rotor-fields respectively;

means of modulating said fields at the preselected frequency; and separate rectifier means connected to each said stator-armature, the outputs of the rectifier means being combined to provide electrical energy output at the preselected frequency.

13. Apparatus for providing AC electrical energy according to claim 12 in which one of said generator fields is modulated by a voltage signal defined by the relationship $A + B \sin wt$ and the other said generator fields is modulated by a voltage signal defined by the relationship $-A + B \sin wt$, wherein "A" is a DC voltage component and "B sin wt" is an AC voltage component.

* * * * *